(No Model.)

J. SIMPSON.
CAN.

No. 253,318. Patented Feb. 7, 1882.

Witnesses.
F. L. Durand
Jno. R. Young

Inventor
Joseph Simpson.
by W. H. Doolittle
Attorney

UNITED STATES PATENT OFFICE.

JOSEPH SIMPSON, OF COLUMBUS, OHIO, ASSIGNOR OF ONE-HALF TO WILLIAM A. GILL, OF SAME PLACE.

CAN.

SPECIFICATION forming part of Letters Patent No. 253,318, dated February 7, 1882.

Application filed December 19, 1881. (No model.)

*To all whom it may concern:*

Be it known that I, JOSEPH SIMPSON, a citizen of the United States, residing at Columbus, in the county of Franklin and State of Ohio, have invented certain new and useful Improvements in Cans; and I do hereby declare the following to be a full, clear, and exact description of the invention, such as will enable others skilled in the art to which it appertains to make and use the same.

The object of my invention is to construct a fruit jar or can of great efficiency as to strength, means of closing it tightly, and convenience of handling the same while the fruit is hot.

It consists in providing a fruit jar or can with, first, a convex or arched shaped top with an upward-turned flange; second, a lid or cap having an arched or convex center and horizontal flange; and, third, a coiled spring-fastening to secure the lid tightly upon the jar, and to afford a convenient handle for the same.

Figure 1:
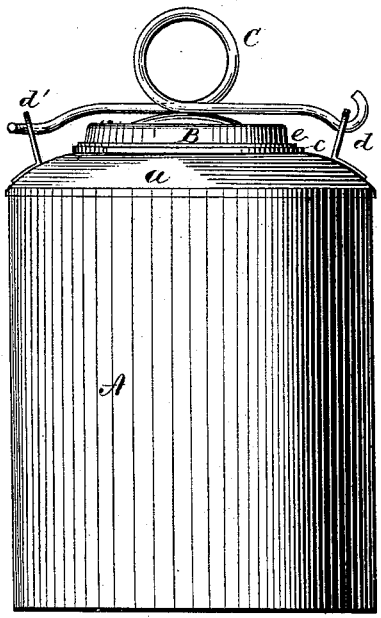
Figure 2:
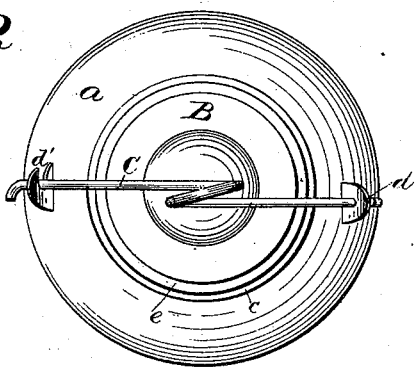
Figure 3:
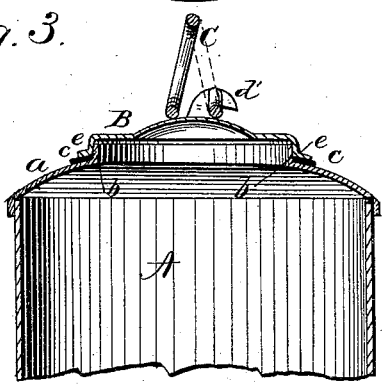

It is illustrated in the accompanying drawings, in which Figure 1 is a perspective view in elevation; Fig. 2, a top view of the lid and fastening device, and Fig. 3 a vertical sectional view of the same.

Similar letters refer to similar parts in the several views.

A represents the body of the can or jar, made of any suitable material, having an arched or convex top, $a$, and an upright chine, $b$, around which a rubber ring, $c$, or other suitable packing, may be placed. The top of the can is made in the shape described to give it greater strength to resist external and internal pressure, and particularly to prevent the sinking in of the same when the pressure of the spring-fastening is applied. The top and its flange are made of one piece by being struck up, or in other suitable manner.

B represents a lid or cap, the top of which is made convex at its center to give it strength, and to prevent the sinking in of the same under pressure of the spring-fastening, and having a slight horizontal flange, $e$, on its edge, so that it may rest flatly upon the packing and not cut it.

C is a spring-fastening, of the form shown, made of wire, coiled at its center, bearing at one or more points upon the lid, and hooked on one side of the top to ear $d$, with the other end curved and held in latch or clasp $d'$ on the opposite side of the top. When in place, with the coil in the center turned up, as shown in Fig 1, and the loose end of the spring pressed under the catch $d'$, the lid is pressed firmly and securely upon the packing $c$, making a perfectly-tight joint with the top, while at the same time the coil answers for a convenient handle, by which the can or jar can be lifted. Especially is this handle convenient in lifting about the jars when filled with hot fruit. While the spring-fastening holds it firm and tight, it nevertheless permits the lid to be quickly and easily removed upon pressing one end of the spring from its catch $d'$.

It is evident that other material than wire may be used for the fastening; also, that it may be flat instead of round, and that the means of attaching its ends to the top may be varied from the form of ear and catch as shown without a substantial departure from the nature of my improvement.

It is evident, also, that a can or jar of this construction may be used for holding or preserving other materials than fruit.

I am aware that cans and jars have been made with bodies having arched or convex tops with upturned flange, also with lids having an arched top, and that coiled spring-fastenings for the same have been used; and I do not therefore claim these device separately or broadly in combination; but What I do claim, and desire to secure by Letters Patent, is—

The combination, in a can or jar, of the arched top $a$, having upright flange $b$, the convex lid or cap B, having a slight flat horizontal flange, $e$, the packing $c$, and the coiled spring-fastening C, of the form shown, coiled at its center, bearing at one or more points upon the lid and hooked on one side of the top $a$ to ear $d$, with the other end curved and held in latch or clasp $d'$ on the opposite side of the top, substantially as described.

In testimony whereof I affix my signature in presence of two witnesses.

JOSEPH SIMPSON.

Witnesses:
W. I. GILMORE,
WM. A. GILL.